(12) United States Patent
Renstrom

(10) Patent No.: US 6,393,452 B1
(45) Date of Patent: May 21, 2002

(54) METHOD AND APPARATUS FOR PERFORMING LOAD BYPASSES IN A FLOATING-POINT UNIT

(75) Inventor: Preston J Renstrom, So. Bloomington, MN (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/316,418

(22) Filed: May 21, 1999

(51) Int. Cl.[7] .............................. G06F 7/38; G06F 7/00
(52) U.S. Cl. ........................ 708/495; 708/501; 708/204
(58) Field of Search ................................ 708/204, 495, 708/496, 497, 498, 499, 501, 523

(56) References Cited

U.S. PATENT DOCUMENTS

| 5,161,117 A | * | 11/1992 | Waggener, Jr. | ............... 708/204 |
| 5,687,106 A | * | 11/1997 | Schwarz et al. | ............ 708/204 |
| 5,805,475 A | * | 9/1998 | Putrino et al. | .............. 708/204 |
| 5,892,697 A | * | 4/1999 | Brakefield | .................. 708/496 |
| 5,940,311 A | * | 8/1999 | Dao et al. | ................... 708/204 |

* cited by examiner

Primary Examiner—Chuong Dinh Ngo

(57) ABSTRACT

The present invention provides a method and apparatus for performing load bypasses with data conversion in a floating-point unit. This process of reading instructions and data out of a cache memory component, of decoding the instructions, of performing the a memory-format-to-register format conversion and of writing the converted data to the register file block of a floating-point unit is known as a load operation. A load operation occurs over many cycles. In accordance with the present invention, the number of cycles required to perform a load operation has been shortened, thereby dramatically increasing the overall throughput of the floating-point unit. In accordance with the present invention, the floating-point unit performs a load bypass with conversion, which significantly shortens the load operation. Data received by the floating-point unit must be converted from a memory format into a register format. The bypass component of the floating-point unit partially converts the data, performs special case exponent detection and generates special case flags. The results of the partial conversion process and the special case flags are then bypassed to the multiply accumulate unit of the floating-point unit. The multiply accumulate unit completes the conversion process while it is performing a first part of the arithmetic operation on the partially converted data. By the time the arithmetic operation has been performed on the partially converted data, the final conversion is complete and the exponent value is available. The remainder of the arithmetic operation is then performed by the multiply accumulate unit on the fully converted data.

19 Claims, 5 Drawing Sheets

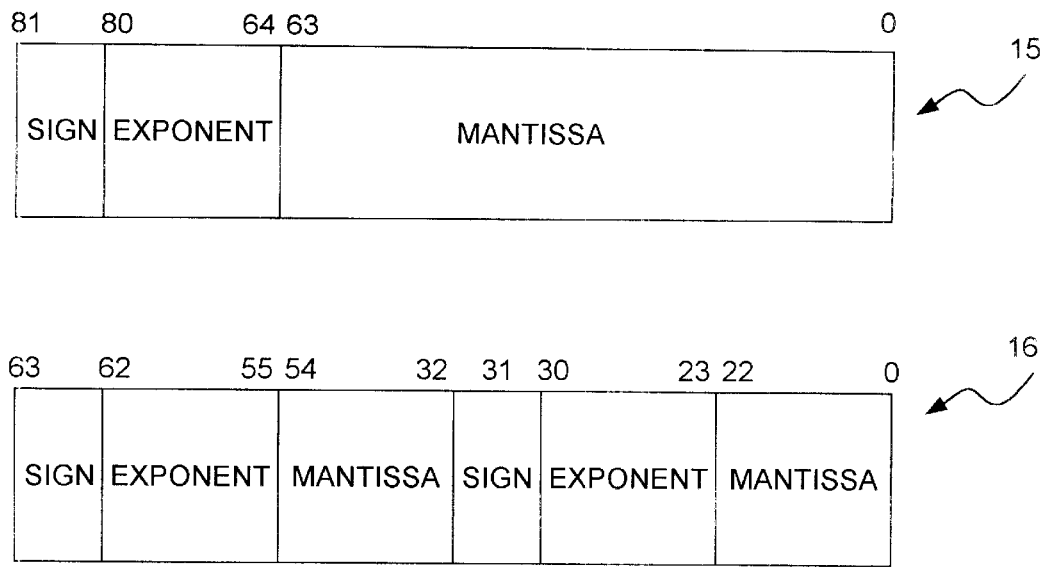
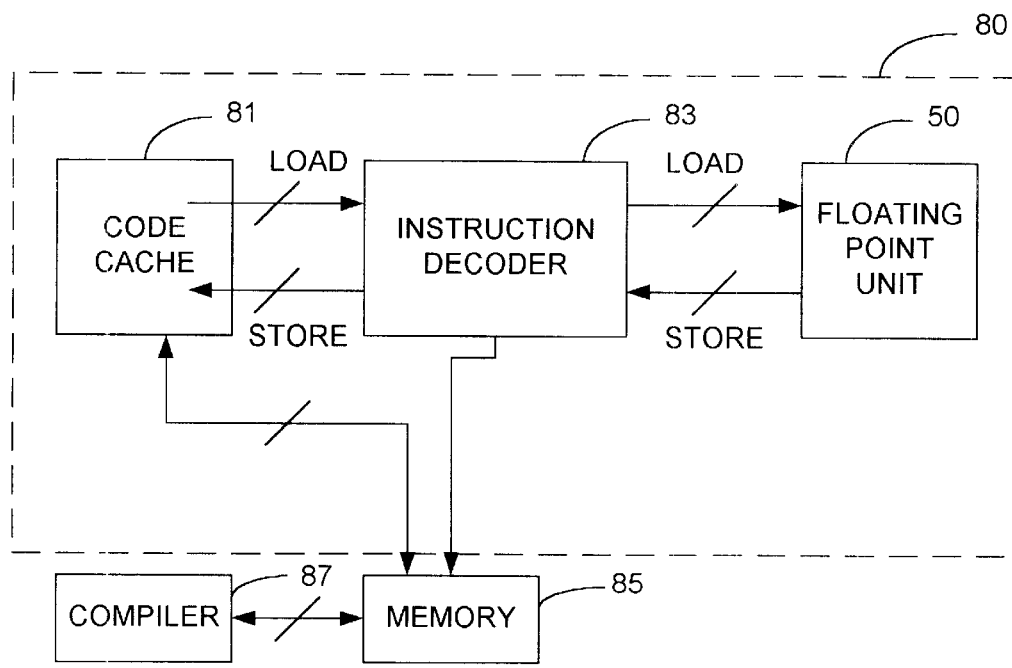
FIG. 3
FIG. 4

METHOD AND APPARATUS FOR PERFORMING LOAD BYPASSES IN A FLOATING-POINT UNIT

TECHNICAL FIELD OF THE INVENTION

The present invention relates to floating-point units and, more particularly, to a floating-point unit which is capable of performing load bypasses with data conversion in order to reduce the amount of time required for a load operation to be completed.

BACKGROUND OF THE INVENTION

Floating-point units have been developed that implement a technique commonly referred to as "bypassing" in order to improve processor performance. When the results of a first operation to be performed by a floating-point unit are needed to be used in a subsequent operation to be performed by the floating-point unit, if bypassing is not performed, the second operation cannot be launched until the results of the first operation are available and have been stored in the register file block of the floating-point unit. However, the results of the first operation typically are available at some point in time prior to the results being stored in the register file block. Bypassing is used to bypass the result of the first operation into the second operation in order to enable the second operation to begin once the results of the first operation are available and prior to those results being stored in the register file block. Therefore, bypassing improves processing throughput of the floating-point unit by eliminating dead states that would be incurred if the second operation could not begin until the results of the first operation had been written back to the register file block.

Load bypassing has been performed in relation to floating-point units. Generally, a load operation involves retrieving instructions and data for a particular operation to be performed from an on-chip or off-chip cache memory element, decoding the instructions, converting the decoded instructions into a form suitable for use by the floating-point unit, and storing the converted data in the register file block. These load operations typically require a large number of cycles. It has been determined that if the number of cycles required for a load operation could be reduced by as little as one cycle, the overall throughput of the floating-point unit could be significantly increased. However, performing a load bypass is a difficult task.

The primary difficulty associated with performing a load bypass is caused by the aforementioned data conversion process which occurs after the instructions have been decoded and before the data is loaded into the register file block. This data conversion is dependent upon the type of data retrieved from the cache memory element. For example, various types of data are typically processed by floating-point units and are defined by the Institute of Electrical and Electronics Engineers (IEEE) floating-point standards. These data types are typically referred to as "non-normal" data types and include de-normalized numbers, infinites, and the not a number (NAN) constant. Other data types also exist that are not defined by the IEEE standards which are architecture-specific and, therefore, require some additional conversion, such as changing the exponent to a particular constant value.

The amount of time required to do this additional exponent conversion makes it particularly difficult to perform load bypasses from a current load instruction A to a floating-point arithmetic instruction B which uses the results of A. Accordingly, a need exists for a floating-point unit which is capable of performing load bypasses with conversion.

SUMMARY OF THE INVENTION

The present invention provides a method and apparatus for performing load bypasses with data conversion in a floating-point unit. The process of reading instructions and data out of a cache memory component, of decoding the instructions, of performing a memory-format-to-register format conversion and of writing the converted data to the register file block of a floating-point unit is known as a load operation. A load operation occurs over many cycles. In accordance with the present invention, the number of cycles normally required to perform a load operation has been shortened significantly, thereby dramatically increasing the overall throughput of the floating-point unit. In accordance with the present invention, the floating-point unit performs a load bypass with conversion, which significantly shortens the load operation time.

The apparatus of the present invention comprises a floating-point unit which comprises a register file, at least one bypass component and at least one multiply accumulate unit. The register file comprises a plurality of registers for storing operand data to be operated on and for storing results of operations that have been performed by the floating-point unit. The bypass component is configured to perform a memory format-to-register format conversion. This memory format-to-register format conversion includes a partial conversion process and a final conversion process. The partial conversion process includes the steps of formatting data into a format which is suitable for storage in the registers of the register file, detecting whether operand data to be operated on includes a special case exponent, and generating at least one special case flag which indicates whether or not a special case exponent has been detected.

The multiply accumulate unit is configured to perform an arithmetic operation on the operand data. The multiply accumulate unit is also configured to receive the results of the partial conversion process including the special case flags and to perform the final conversion process. Once the bypass component has performed the partial conversion process, the bypass component bypasses the results of the partial conversion process, including the special case flags, to the multiply accumulate unit. While the results of the partial conversion process including the special case flag are being bypassed to the multiply accumulate unit, the bypass component performs the final conversion process and writes the results of the final conversion process to the register file. The final conversion process completes the memory format-to register format conversion.

While the bypass component is writing the results of the final conversion process to the register file, the multiply accumulate unit begins operating on the results of the partial conversion process and simultaneously performs the final conversion process. During the final conversion process, the multiply accumulate unit utilizes the special case flags in order to obtain a converted exponent value. While the multiply accumulate unit is performing the final conversion process, it begins performing the arithmetic operation on the partially converted results. The first phase of this arithmetic operation does not require the fully converted results. However, the second and third phases of this operation do require the fully converted results because the exponent value is need, which is obtained during the final conversion process. The final conversion process is completed by the time the multiply accumulate unit needs the fully converted results.

These and other features and advantages of the present invention will become apparent from the following description, drawings and claims.

BRIEF DESCRIPTION OF THE DRAWINGS

FIG. 3 illustrates the bit fields of two different data type formats that can be operated on by the floating-point units shown in FIGS. 1 and 2.

FIG. 4 is a functional block diagram of a portion of the processor architecture of the present invention that includes a floating-point unit, and which will be used to demonstrate the performance of a load operation.

DETAILED DESCRIPTION OF THE PREFERRED EMBODIMENT

Figure 1:
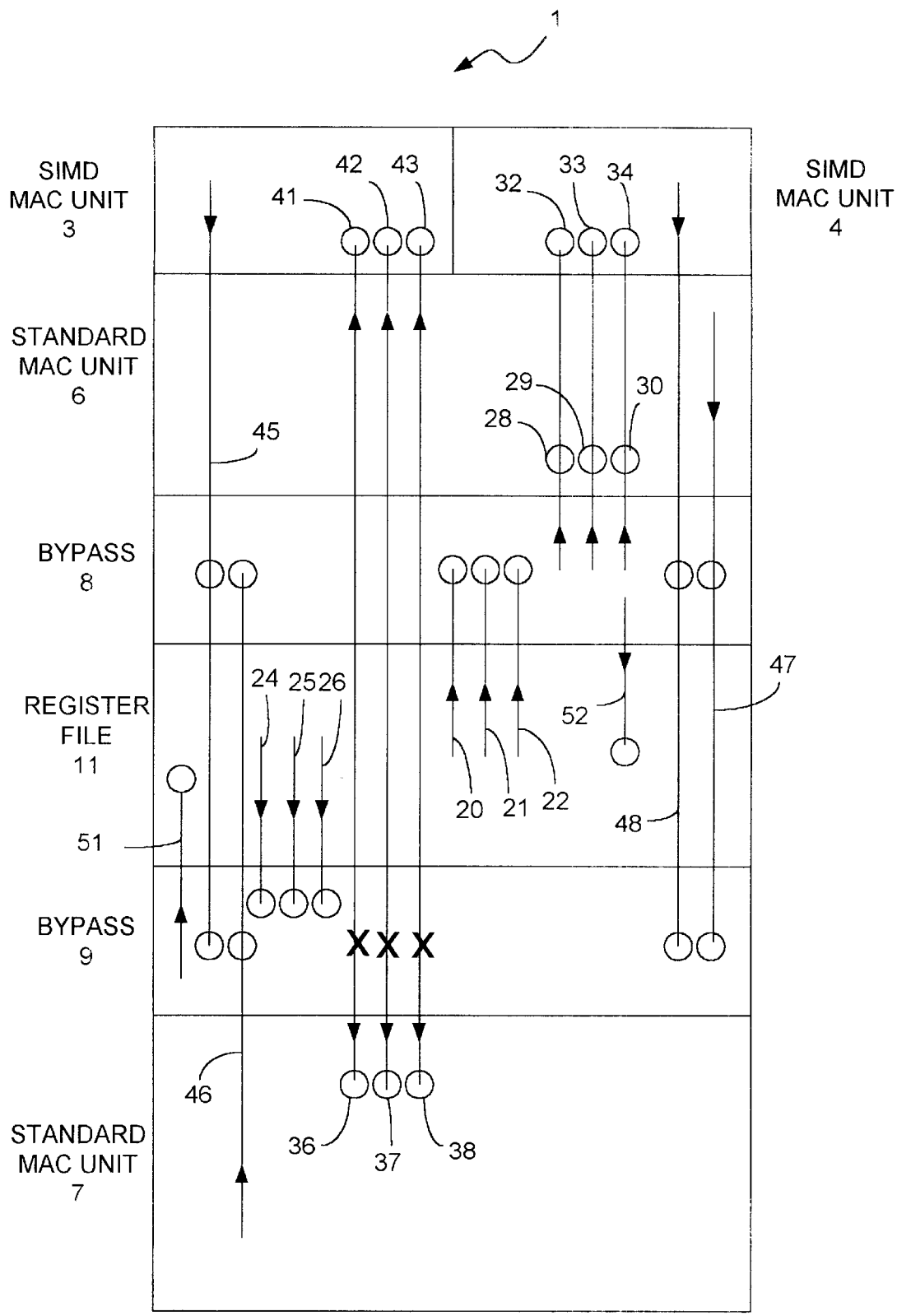
FIG. 1 is a functional block diagram of a floating-point unit which utilizes two dedicated SIMD MAC units for performing SIMD operations.
Figure 2:
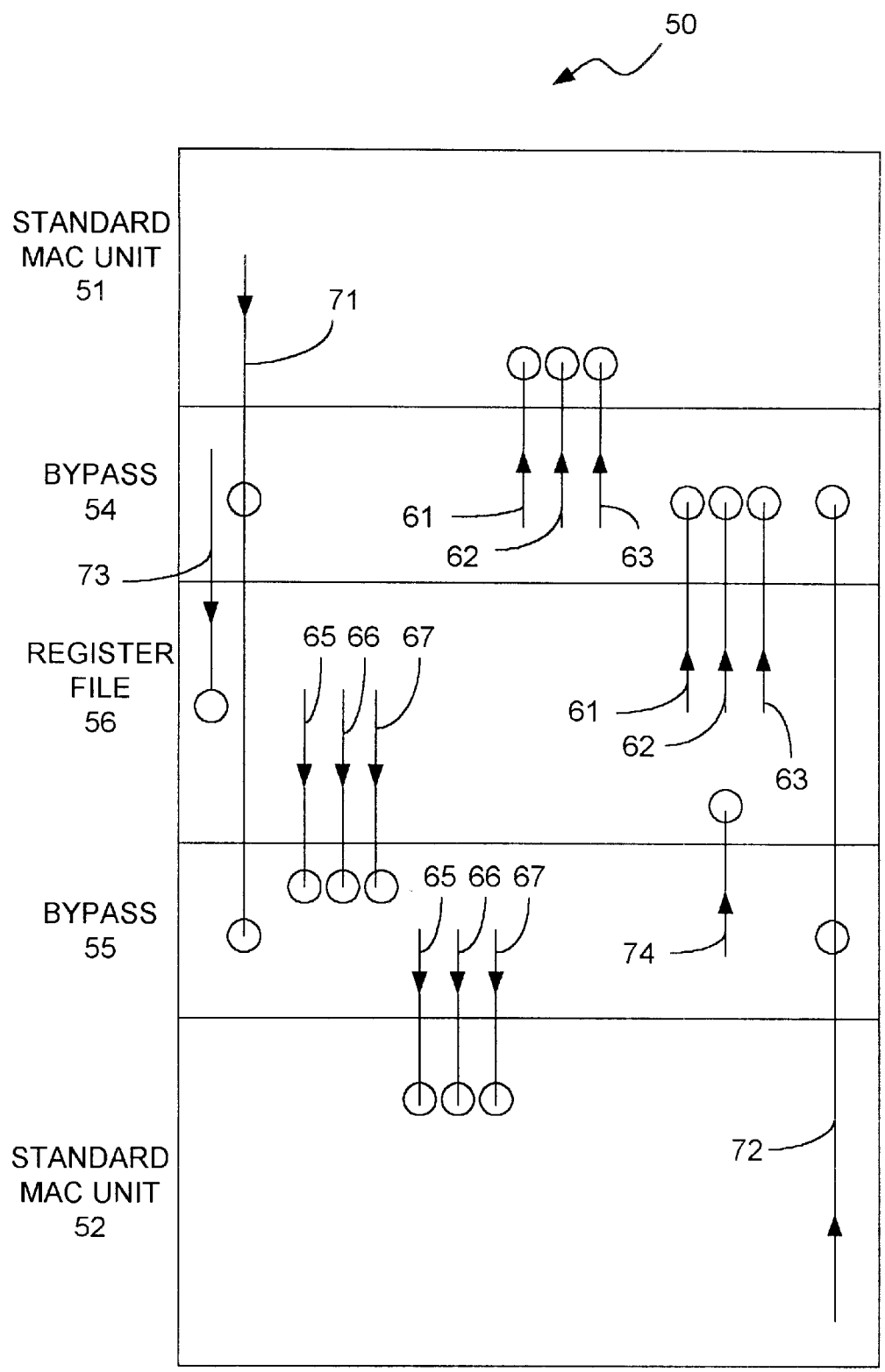
FIG. 2 is a functional block diagram of the floating-point unit which does not utilize dedicated SIMD MAC units for performing SIMD operations, but rather, which utilizes standard MAC units for performing all of the arithmetic operations, including SIMD operations.

It should be noted that the method and apparatus of the present invention may be implemented in virtually any floating-point unit. For purposes of illustration, two different floating-point unit architectures, which are shown in FIGS. 1 and 2 will be discussed in connection with the method and apparatus of the present invention for performing load bypasses. Those skilled in the art will understand that the present invention is not limited to use with these particular architectures and that any floating-point architecture can implement the method and apparatus of the present invention.

Prior to discussing the method and apparatus of the present invention, a discussion of the floating-point units shown in FIGS. 1 and 2 will be provided in order to generally illustrate the manner in which these different floating-point units perform their respective operations. Each of these floating-point units is capable of operating on traditional data type formats and on single instruction, multiple data (SIMD) type formats. However, the floating-point units of FIGS. 1 and 2 are configured differently to perform these operations. Generally, the floating-point unit shown in FIG. 1 has greater throughput than the floating-point unit of FIG. 2. However, the floating-point unit of FIG. 2 consumes less die area than the floating-point unit of FIG. 1. Therefore, each of these floating-point units have certain advantages over the other. Once the floating-point units of FIGS. 1 and 2 have been described, a detailed discussion of the method and apparatus of the present invention will be described.

As processor speeds and data sizes increase, a critical bottleneck in computation performance for floating-point operations exists with respect to the amount of data that can be brought into the floating-point unit at any one time. With the evolution of processor architectures to 64-bit architectures and greater, certain techniques have been developed to reduce the impact of this bottleneck. One such technique, which is utilized by the floating-point units of FIGS. 1 and 2, divides the 64-bit data into smaller pieces and performs multiple operations on these smaller pieces. This type of operation is commonly referred to as a single instruction, multiple data (SIMD) operation. An SIMD instruction causes identical operations to be performed on multiple pieces of data at the same time, i.e., in parallel.

However, the floating-point units of FIGS. 1 and 2 also are capable of performing operations on traditional data type formats. Traditional data type formats typically have wider bit sizes than SIMD data type formats. In order to support both of these types of operations, the floating-point unit of FIG. 1 uses dedicated SIMD MAC units for performing the SIMD operations and standard MAC units for operating on traditional data type formats. The floating-point unit 1 of FIG. 1 comprises two SIMD MAC units 3 and 4, two standard MAC units 6 and 7, two bypass blocks 8 and 9 and a register file block 1. The standard MAC units 6 and 7 perform floating-point operations on traditional data type formats. The SIMD MAC units 3 and 4 perform mathematical operations on SIMD data type formats.

These two data type formats are shown in FIG. 3. A typical, or traditional, data type format 15 comprises a 64-bit mantissa value, a 17-bit exponent value and a 1-bit sign value. In contrast, an SIMD data type format 16 comprises two 23-bit mantissa values, two 8-bit exponent values (i.e., one associated with each of the mantissa values), and two sign bits (i.e., one bit associated with each mantissa value and its exponent). Both of these data type formats are well known in the art and are documented in the IEEE standards for floating-point operations. The manner in which operations are performed on these data type formats is also well known in the art. Therefore, a detailed discussion of these floating-point data types and of the operations performed on them will not be provided herein in the interest of brevity.

In the floating-point unit 1 shown in FIG. 1, each of the standard MAC units 6 and 7 are capable of performing a multiply accumulate operation (i.e., A+B×C). When a multiply accumulate operation is to be performed on the data type format 15 shown in FIG. 3, the operands A, B and C are delivered to the bypass blocks 8 and 9. Since the floating-point unit 1 comprises two standard MAC units 6 and 7, two multiply accumulate operations can be performed simultaneously (i.e., one multiply accumulate operation is performed in standard MAC unit 6 and the other is performed in standard MAC unit 7).

Each of the standard MAC units 6 and 7 comprises one 82-bit adder and one 82-bit multiplier. The operands to be operated on are received by the register file block 11 from an instruction decoder (not shown) comprised by the processor architecture. The instruction decoder provides control bits to the register file block 11 along with the operands and these control bits are utilized by the MAC units to determine the type of arithmetic operation to be performed on the operands, e.g., adds, subtracts, multiplies, etc. The register file block 11 comprises a plurality of registers in which the operands received by the register file block 11 are stored.

The control bits received by the register file block 11 indicate which registers in the register file block 11 are to be utilized for reading and writing the operands. Each of the bypass blocks 8 and 9 handles one set of operands. The bypass blocks 8 and 9 also utilize control bits provided to them to determine which register contents are to be routed to a particular destination in the floating-point unit 1. As stated above, the bypass blocks 8 and 9 improve performance by bypassing the results of one operation into another operation when the results of one of the operations are available, rather than waiting for the available results to be written back to the register file block. In accordance with the present invention, the bypass blocks 8 and 9 also bypass loads, as discussed below in detail with reference to FIGS. 3–5.

After the operands have been written to the appropriate registers in the register file block 11, the register file block 11 reads the operands out of the appropriate registers and the register file 11 passes them to the appropriate bypass block, as indicated by the arrows on lines 20, 21 and 22 directed from the register file block 11 to the bypass block 8. The lines 20, 21 and 22 correspond to the operand bus comprised in the floating-point unit 1 and each of the lines 20, 21 and 22 corresponds to a plurality of lines needed for transporting the multi-bit operands A, B and C. The circles in FIG. 1 are intended to denote bus inputs to the blocks on which they are located. The register file block 11 reads the second set of operands A, B and C out of the appropriate registers in the register file block 11 which routes them to the appropriate bypass block, as indicated by the arrows on lines 24, 25 and 26. These lines also represent a plurality of operand bus lines.

The bypass block 8 delivers its set of operands, which have been read from the register file block 11, either to the standard MAC unit 6 via bus inputs 28, 29 and 30 or to the SIMD MAC unit 4 via the bus inputs 32, 33 and 34. Similarly, the bypass block 9 either delivers its set of operands to the standard MAC unit 7 via bus inputs 36, 37 and 38 or to the SIMD MAC unit 3 via bus inputs 41, 42 and 43.

In the case of the data type format 15 shown in FIG. 3, the bypass blocks 8 and 9 will provide the operands to the standard MAC units 6 and 7, respectively. Once the standard MAC units 6 and 7 have performed their respective arithmetic operations, the results are delivered by the standard MAC units 6 and 7 to the bypass blocks 8 and 9. The bypass blocks 8 and 9 pass the results of the arithmetic operations to the register file block 11 via buses 51 and 52, which then stores the results in one or more registers in the register file block 11.

Whenever an operation is to be performed by the floating-point unit 1, the control bits received by the register file block 11 indicate which registers the results of the associated operations are to be stored in once the operations have been performed. The bypass blocks 8 and 9 also receive control bits which the bypass blocks utilize to determine when bypasses are to be performed.

Each of the SIMD MAC units 3 and 4 comprises two 32-bit adders and two 32-bit multipliers. Each of the SIMD MAC units 3 and 4 is capable of processing three operands A, B and C to perform the arithmetic operation indicated by the instruction decoder. The manners in which the SIMD MAC units 3 and 4 and the standard MAC units 6 and 7 operate on the data type formats 15 and 16 shown in FIG. 3 are well-known to those skilled in the art. Therefore, a detailed discussion of the manner in which these units perform their multiply accumulate operations (i.e., A+B×C) will not be discussed herein.

Although the floating-point unit 1 is capable of processing traditional data type formats and SIMD data type formats, the SIMD MAC units 3 and 4 consume die area. SIMD operations are performed rarely and the SIMD MAC units 3 and 4 are dormant whenever traditional data type formats are being processed by the standard MAC units 6 and 7. Similarly, the standard MAC units 6 and 7 are dormant whenever SIMD operations are being performed by the SIMD MAC units 3 and 4. Therefore, the SIMD MAC units 3 and 4 and the standard MAC units 6 and 7 consume die area, even though they are not utilized for all operations. However, utilizing dedicated SIMD MAC units also improves processing throughput.

A second floating-point unit 50 is shown in FIG. 2. Preferably, the present invention is implemented in the floating-point unit 50. This floating-point unit utilizes standard MAC units 51 and 52 for performing all arithmetic operations, including operations to be performed on SIMD data type formats. Therefore, the dedicated SIMD MAC units 3 and 4 shown in FIG. 1 have been eliminated. This allows a savings to be realized in terms of the amount of die area required for implementation of the floating-point unit 50. However, this savings also results in a performance penalty, as discussed below in more detail.

The standard MAC units 51 and 52 preferably are very similar to the standard MAC units 6 and 7 shown in FIG. 1. In this case, the standard MAC units 51 and 52 will each comprise one 82-bit adder and one 82-bit multiplier (not shown). However, the standard MAC units 51 and 52 are each configured to receive a particular bit and to utilize this bit to cause the standard MAC units to select the appropriate half of a 64-bit word, as described below in more detail.

When a traditional data type format 15 is to be processed by the floating-point unit 50, the standard MAC units 51 and 52 perform their normal operations. However, when a SIMD data type format 16 is to be processed by the floating-point unit 50, the SIMD bit field is split into two 32-bit words and the lower 32 bits of the SIMD word are processed by standard MAC unit 51 and the upper 32 bits of the SIMD word are processed by standard MAC unit 52. Although the entire 64-bit word is provided to both of the standard MAC units 51 and 52, the aforementioned bits received by the standard MAC units 51 and 52 cause the standard MAC units 51 and 52 to select the appropriate 32-bit word. The standard MAC units 51 and 52 then perform their respective operations on these 32-bit words.

As stated above, the standard MAC units 51 and 52 normally process 82-bit words. When processing SIMD words, only the lower 64 bits are utilized by the standard MAC units 51 and 52. The upper 18 bits are set to a constant value and generally are ignored. Once the standard MAC units 51 and 52 have processed their respective portions of the 64-bit SIMD word, the bypass blocks 54 and 55 coalesce the 32-bit results into a 64-bit SIMD result. The bypass blocks 54 and 55 write the lower and upper 32-bit words, respectively, to the register file block 56 by writing the bits to adjacent bit fields in the register file block 56 in such a manner that the 64-bit result written to the register file block 56 is as it would have been if it had been processed by an SIMD MAC unit such as SIMD MAC unit 3 or 4 shown in FIG. 1.

The lines shown in the floating-point unit 50 of FIG. 2 are being used in the same manner in which they were used in FIG. 1 to denote buses. The arrows are being used to indicate the direction of flow of the data and the circles are being used to indicate bus inputs. The lines 61, 62 and 63 represent the lower 32 bits of the SIMD word. Therefore, in SIMD mode, each of the buses 61, 62 and 63 transports a 32-bit operand (i.e., A, B and C). When the SIMD words are delivered to the floating-point unit 50, the register file block 56 loads the SIMD bits into the appropriate registers of the register file block 56 in accordance with control bits received by the register file block 56. The bypass block 54 selects the lower 32-bit portions of the SIMD words and routes the 32-bit words over buses 61, 62 and 63 from the register file block 56 to the standard MAC unit 51. Simultaneously, the bypass block 55 routes the upper 32-bit portions of the SIMD words over bus lines 65, 66 and 67 to the standard MAC unit 52.

The standard MAC unit 51 and the standard MAC unit 52 simultaneously perform multiply accumulate operations on their respective portions of the SIMD word. The standard MAC units 51 and 52 both produce 32-bit results, which are routed over bus lines 71 and 72, respectively, to the bypass blocks 54 and 55. The results are then coalesced by the bypass blocks 54 and 55 to produce a 64-bit SIMD result, which is then written to the appropriate registers in the register file block 56.

It should be noted that the floating-point unit 1 shown in FIG. 1 is capable of performing two SIMD operations simultaneously to generate four SIMD results, which are in pairs of two. With the floating-point unit 50 shown in FIG. 2, only one SIMD operation is capable of being performed at a time. Therefore, with respect to the performance of SIMD operations, the floating-point unit 50 shown in FIG. 2 generally has half the throughput of the floating-point unit 1 shown in FIG. 1. If SIMD operations were performed frequently, the overall throughput of the floating-point unit 50 would be much less than the overall throughput of the floating-point unit 1. However, SIMD operations typically only represent less than five percent of the total operations performed by floating-point units. Therefore, the decrease in the throughput of the floating-point unit 50 resulting from the performance of SIMD operations in the standard MAC units 51 and 52 is not greatly significant and is offset by the savings in die area.

Figure 5:
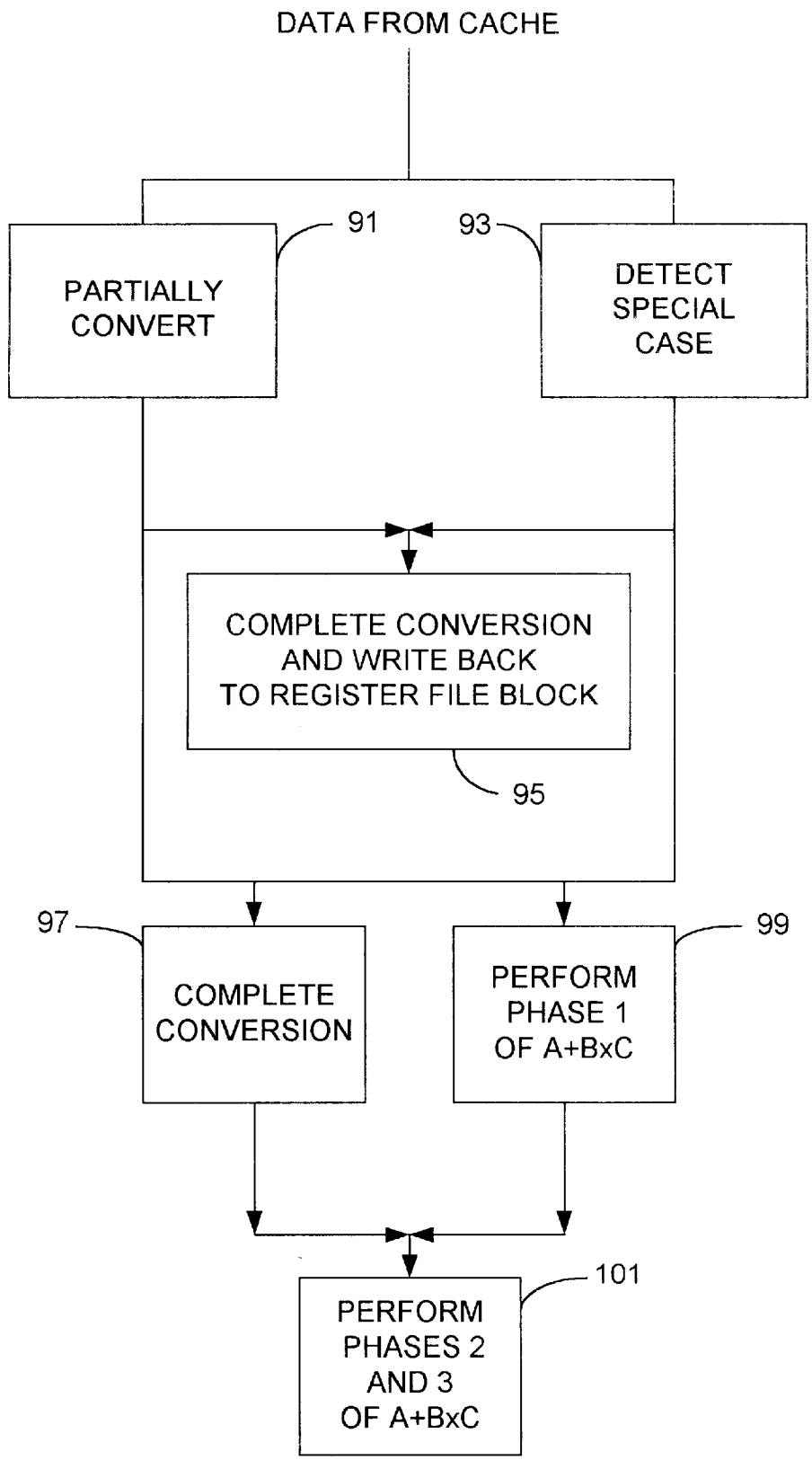
FIG. 5 is a functional block diagram that functionally illustrates pipe stages in a floating-point unit which implements the method and apparatus of the present invention.

The method and apparatus of the present invention will now be described with reference to FIGS. 4–6. For illustrative purposes, it will be assumed that the method and apparatus of the present invention for performing a load bypass are being implemented in the floating-point unit 1 of FIG. 1. However, as stated above, the present invention is not limited to being implemented in any particular floating-point unit. FIG. 4 illustrates a circuit 80 of the processor architecture which controls the loading of instructions and data from a cache memory component 81 into the floating-point unit 50 and the storing of data from the floating-point unit 50 and storage of the data in the cache memory component 81. The circuit 80 comprises an instruction decoder 83 which controls the retrieval of data from and storage of data in the cache memory component 81 and the loading of data in and retrieval of data from the floating-point unit 50.

The circuit 80 communicates with a memory component 85, which preferably is off-chip, which stores instructions and data when they are not residing in the cache memory component 81. Those skilled in the art will understand that the memory component 85 could be an on-chip memory component. However, implementing the memory component 85 on-chip may be expensive in terms of die area, and therefore, preferably is implemented as an off-chip component.

A compiler 87, which is external to the circuit 80, controls which instructions and data are to reside in the cache memory component 81 and which are to reside in memory element 85. As will be understood by those skilled in the art, the compiler 87 typically is a software component which optimizes program execution by utilizing various optimization techniques such as, for example, code reordering. The compiler 87 utilizes these optimization techniques and causes particular pieces of code and data to be moved from memory element 85 into the cache memory component 81, and vice versa.

The instruction decoder 83 reads instructions and data out of the cache memory component 81 and determines the type of operation to be performed on the data. The instruction decoder 83 then causes the data to be loaded into one of the bypass blocks 8 and 9. Each of the bypass blocks comprise conversion circuitry which performs a memory format-to-register format conversion. Once the conversion is performed, the converted data is written to the appropriate registers in the register file block 56 of the floating-point unit 50. This process of reading the instructions and data out of the cache memory component, of decoding the instructions, of performing the conversion and of writing the converted data to the register file block is known as a load operation.

A load operation occurs over many cycles. In accordance with the present invention, it has been determined that if the number of cycles required to perform a load operation can be shortened by as little as one cycle, the overall throughput of the floating-point unit can be dramatically increased. In accordance with the present invention, the floating-point unit 1 performs a load bypass, which shortens the load operation time by at least two cycles. In order to demonstrate the manner in which the present invention performs the load bypass, the memory format-to-register format data conversion process will first be described. This type of conversion process is performed in many floating-point units that are currently utilized in processor architectures in use today. Therefore, this type of conversion process is understood by those skilled in the art and, in the interest of brevity, only a general description of the conversion process will be provided herein.

The conversion process generally is comprised of a first part and a second part. During the first part of the process, the data delivered to the floating-point unit is formatted to accommodate the 82-bit registers of the floating-point unit 1. If the data is a single-precision word, it is stretched into an 82-bit word and the 50 unused bits are set to a constant value. If the data corresponds to a double precision word, the data is stretched into an 82-bit word and the 18 unused bits are set to a constant value. Therefore, the type of conversion performed depends on the type of data read out of the cache memory component and on the architecture of the floating-point unit.

The second part of the conversion process relates to identifying specific ranges of the exponent and mantissa values contained in the data and setting the converted exponent to a constant value. There are several types of special case exponents that floating-point units are normally designed to handle. These special case exponents are defined in the IEEE floating-point standards and include denormals, double precision denormals, double extended precision denormals, zero and maximum exponent. Each of these has a special case exponent constant associated with it. During the conversion process, these special cases are detected and special case flags are generated in response to the detection of the special cases. These special case flags are then utilized by a multiplexer (not shown) which multiplexes constants into the data at appropriate bit locations to obtain the converted exponent value. Once the first and second parts of the conversion process have been performed, the data can be fully processed by the MAC unit performing the operation and then written back to the register file block 11.

Although the first part of the conversion process can be performed relatively quickly, the second part of the conversion process takes a larger amount of time to perform. This is because the process of detecting the exponent constants and of setting the appropriate special case flags is a relatively complex function to implement in circuitry. Due to the length of time needed to perform the entire conversion process, the fully-converted data cannot be bypassed to the MAC unit intended to perform the operation by the time that the data is needed by the MAC unit. However, in accordance with the present invention, it has been determined that a portion of the conversion process can be completed in time to bypass the partially-converted results to the MAC unit.

The manner in which this is accomplished will now be described with reference to FIG. 5. The first part of the conversion process, which is represented by block 91, is performed in parallel with the special case detection process associated with the second part of the conversion process, which is represented by block 93. Both of these processes are performed by conversion circuitry (not shown) contained in the bypass block. The results of the first part of the conversion process and the special case flags generated during the special case detection process are then bypassed to the MAC unit. As the bypass block is bypassing the data to the MAC unit, the conversion circuitry in the bypass block completes the conversion process and stores the fully-converted data in the appropriate register in the register file block, as indicated by block 95. The conversion circuitry utilizes the special case flags to multiplex in the appropriate exponent constants at the appropriate bit locations in the data.

The MAC units of the floating-point unit also comprise conversion circuitry for performing the remainder of the conversion process. This conversion circuitry also utilizes the special case flags to multiplex in the appropriate exponent constants at the appropriate bit locations in the data in order to complete the conversion, as indicated by block 97. Once the data has been fully converted, the MAC unit performs its operations on the data, as indicated by blocks 97, 99 and 101. The results of these operations are then written to the register file block by the bypass block. The results may also be bypassed from the MAC unit where they are generated to another MAC unit where they can be utilized in another operation (i.e., a typical operation can be performed).

When a MAC unit performs an arithmetic operation on operand data, it does not need the exponent in the first cycle of the operation. The exponent is not needed until the second cycle of the operation. Therefore, when the partial conversion results and the special case flags are bypassed to the MAC unit, the MAC unit has one cycle before it needs the exponent during which the MAC unit performs the remainder of the conversion. Therefore, the first phase of the operation can be performed while the partially converted data is being fully converted, as indicated by block 99.

Figure 6:
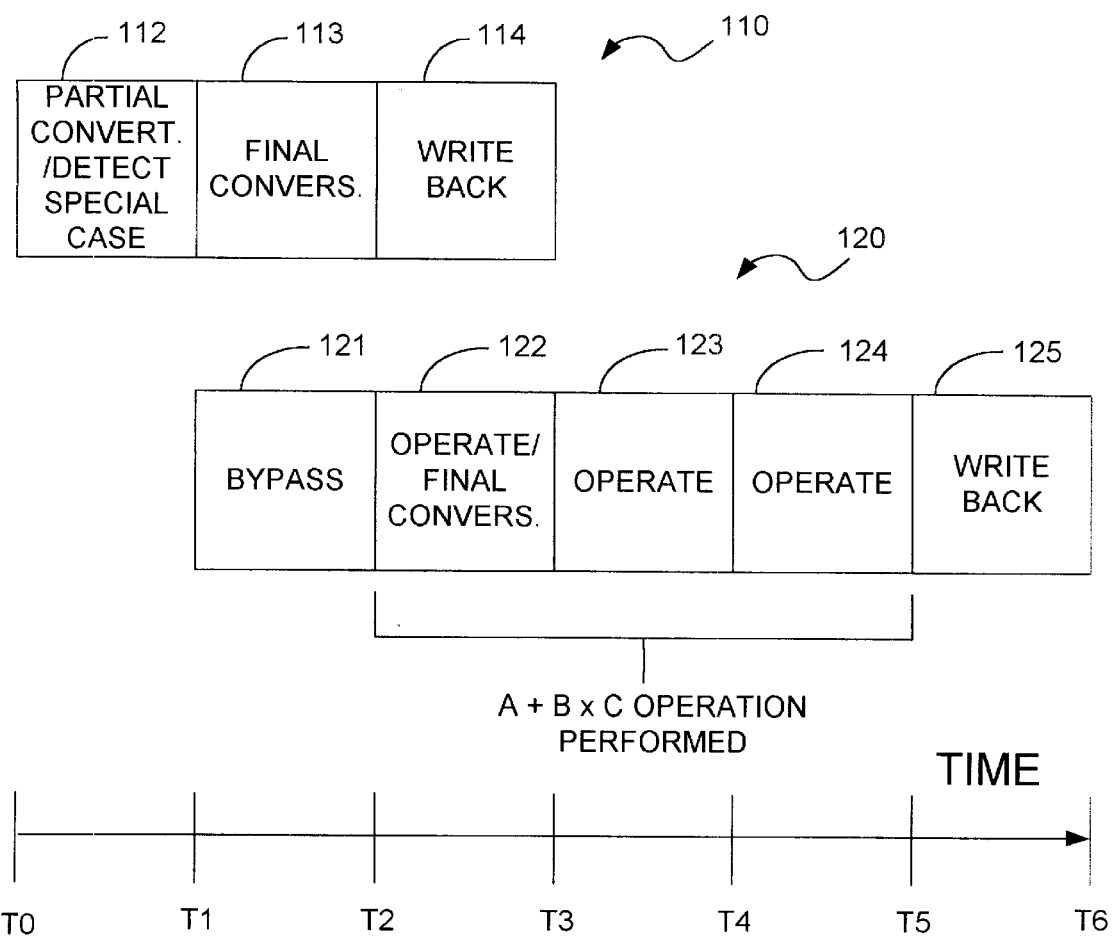
FIG. 6 is a timing diagram demonstrating the performance of a load bypass by a floating-point unit incorporating the method and apparatus of the present invention.

FIG. 6 is a timing diagram of illustrating the timing of the operations being performed in the bypass block and in the MAC unit. The group of blocks 110 corresponds to operations being performed in one of the bypass blocks. The group of blocks 120 corresponds to operations being performed in one of the MAC units. During a first time period from T0 to T1, the partial conversion process and the special case detection process, represented by block 112, are performed. During a second time period from time T1 to T2, the special case flags and the partially converted data are bypassed to the MAC unit, as indicated by blocks 113 and 121. While the data and flags are being bypassed to the MAC unit, during the time period from T1 to T2, the bypass block performs the remainder of the conversion. In the time period from T2 to T3, the bypass block writes the converted data to the register file block, as indicated by block 114.

While the fully-converted data is being written back to the register file block by the bypass block, the MAC unit begins the first phase of the multiply accumulate operation, which is represented by block 122. While the first phase of the operation is being performed by the MAC unit, the remainder of the conversion is being performed in parallel by the MAC unit. The second and third phases of the multiply accumulate operation, which are represented by block 123 and 124, utilize the exponent, which is obtained during the final conversion process represented by block 122. The second and third phases of the operation are performed during the time period from T3 to T5. The results of the operation are then written back to the register file block during the time period from T5 to T6. This step is represented by block 125.

It is apparent from the timing diagram of FIG. 6 that if the MAC unit waited for the fully-converted data to be written back to the register file block, obtained the data from the register file block and then began performing the multiply accumulate operation, the first phase of the operation, represented by block 122, could not begin until some time after T3 (i.e., until after the write back step represented by block 114). In fact, since it takes a step for the data to be passed from the register file block to the MAC unit, the multiply accumulate operation could not begin until time T4. By performing the load bypass of the present invention, the amount of time required for a load operation to be performed is lessened significantly. Assuming the time periods represent cycles, the time that it normally takes to perform a load operation can be reduced by at least two cycles. As stated above, this results in a significant improvement in overall processing throughput, as will be recognized by those skilled in the art.

It should be noted that the time periods shown in FIG. 6 may or may not correspond to clock cycles. Each time period may correspond to a portion of a cycle or to more than one clock cycle. The present invention is not limited with respect to the duration of the time periods required for performance of the functions represented by the blocks shown in FIG. 6, as will be understood by those skilled in the art.

It will be understood by those skilled in the art that the present invention has been described with respect to the preferred embodiment and that the present invention is not limited to this embodiment. Those skilled in the art will also realize that modifications can be made to the embodiment described above which are within the scope of the present invention. Also, those skilled in the art will understand that certain components of the present invention which have been discussed as being implemented solely in hardware may be implemented in hardware, software or a combination of hardware and software.

What is claimed is:

1. A floating-point unit configured to perform load bypass operations, the floating-point unit comprising:

a register file, the register file comprising a plurality of registers for storing operand data to be operated on and for storing results of operations that have been performed by the floating-point unit;

at least one bypass component, the bypass component being configured to perform a memory format-to-register format conversion, the memory format-to-register format conversion including a partial conversion process and a final conversion process, the partial conversion process including the steps of formatting data into a format which is suitable for storage in the registers of the register file, detecting whether operand data to be operated on includes a special case exponent, and generating at least one special case flag which indicates whether or not a special case exponent has been detected;

at least one multiply accumulate unit, the multiply accumulate unit being configured to perform an arithmetic operation on the operand data, the multiply accumulate unit being configured to receive the results of the partial conversion process including said at least one special case flag and to perform the final conversion process.

2. The apparatus of claim 1, wherein the bypass component bypasses the results of the partial conversion process, including said at least one special case flag, to the multiply accumulate unit, and wherein while the results of the partial conversion process including said at least one special case flag are being bypassed to the multiply accumulate unit, the bypass component performs the final conversion process and writes the results of the final conversion process to the register file, wherein the final conversion process completes the memory format-to register format conversion.

3. The apparatus of claim 2, wherein while the bypass component is writing the results of the final conversion process to the register file, the multiply accumulate unit begins operating on the results of the partial conversion process and simultaneously performs the final conversion process, wherein during the final conversion process, the multiply accumulate unit utilizes said at least one special case flag in order to obtain a converted exponent value.

4. The apparatus of claim 3, wherein during a first time period from T0 to T1, the bypass component performs the partial conversion process, and wherein during a time period from T1 to T2, the bypass component performs the final conversion process and bypasses the results of the partial conversion process, including said at least one special case flag, to the multiply accumulate unit, and wherein during a time period from T2 to T3, the bypass component writes the results of the final conversion process to the register file, wherein as the bypass component is writing the results of the final conversion process to the register file during the time period from T2 to T3, the multiply accumulate unit performs the final conversion process and simultaneously performs a first operation phase during which the multiply accumulate unit begins performing an arithmetic operation on the results of the partial conversion process, wherein during a time period from T3 to T4, the multiply accumulate unit performs a second operation phase during which the multiply accumulate unit continues to perform the arithmetic operation on the results of the final conversion process, and wherein during a time period from T4 to T5, the multiply accumulate unit performs a third operation phase during which the multiply accumulate unit completes the arithmetic operation on the results of the final conversion process.

5. The apparatus of claim 4, wherein the multiply accumulate unit performs an operation defined by an equation, A+B×C, wherein A, B and C are the operands being operated on by the multiply accumulate unit, and wherein during the first operation phase, an exponent value is not needed during the arithmetic operation, wherein the exponent value is obtained during the final conversion process performed by the multiply accumulate unit so that it is available at the beginning of the second operation phase, wherein the exponent value is utilized in the second and third operation phases.

6. The apparatus of claim 5, wherein the time periods T0 to T1, T1 to T2, T2 to T3, T3 to T4 and T4 to T5 are equal time periods.

7. The apparatus of claim 6, wherein each time period corresponds to a clock cycle.

8. The apparatus of claim 1 further comprising:
a second bypass component, the second bypass component being configured to perform said memory format-to-register format conversion;

a second multiply accumulate unit, the second multiply accumulate unit being configured to perform an arithmetic operation on the operand data, the second multiply accumulate unit being configured to receive the results of the partial conversion process including said at least one special case flag and to perform the final conversion process.

9. The apparatus of claim 8, wherein the second bypass component bypasses the results of the partial conversion process, including said at least one special case flag, to the second multiply accumulate unit, and wherein while the results of the partial conversion process including the special case flag are being bypassed to the second multiply accumulate unit, the second bypass component performs the final conversion process and writes the results of the final conversion process to the register file, wherein the final conversion process performed by the bypass component completes the memory format-to register format conversion.

10. The apparatus of claim 9, wherein while the second bypass component is writing the results of the final conversion process to the register file, the second multiply accumulate unit begins operating on the results of the partial conversion process and simultaneously performs the final conversion process, wherein while the final conversion process is being performed by the second bypass component, the second multiply accumulate unit utilizes said at least one special case flag in order to obtain a converted exponent value.

11. The apparatus of claim 10, wherein during a first time period from T6 to T7, the second bypass component performs the partial conversion process, and wherein during a time period from T7 to T8, the second bypass component performs the final conversion process and bypasses the results of the partial conversion process, including said at least one special case flag, to the second multiply accumulate unit, and wherein during a time period from T8 to T9, the second bypass component writes the results of the final conversion process to the register file, wherein as the second bypass component is writing the results of the final conversion process to the register file during the time period from T8 to T9, the second multiply accumulate unit performs the final conversion process and simultaneously performs a first operation phase during which the second multiply accumulate unit begins performing an arithmetic operation on the results of the partial conversion process, wherein during a time period from T9 to T10, the multiply accumulate unit performs a second operation phase during which the multiply accumulate unit continues to perform the arithmetic operation on the results of the final conversion process, and wherein during a time period from T10 to T11, the multiply accumulate unit performs a third operation phase during which the multiply accumulate unit completes the arithmetic operation on the results of the final conversion process.

12. The apparatus of claim 11, wherein the second multiply accumulate unit performs an operation defined by an equation, A+B×C, wherein A, B and C are the operands being operated on by the second multiply accumulate unit, and wherein during the first operation phase, an exponent value is not needed during the arithmetic operation, wherein the exponent value is obtained during the final conversion process performed by the second multiply accumulate unit so that it is available at the beginning of the second operation phase, wherein the exponent value is utilized in the second and third operation phases.

13. The apparatus of claim 12, wherein the time periods T6 to T7, T7 to T8, T8 to T9, T9 to T10 and T11 to T12 are equal time periods.

14. The apparatus of claim 13, wherein each time period corresponds to a clock cycle.

15. A method of processing data in a floating-point unit, the method comprising the steps of:

performing a partial memory format-to-register format conversion in a bypass component of the floating-point unit;

utilizing a bypass component of the floating-point unit to bypass the results of the partial memory format-to-register format conversion to a multiply accumulate unit of the floating-point unit; and completing the memory format-to-register format conversion in the multiply accumulate unit.

16. The method of claim 15, wherein the step of performing a partial memory format-to-register format conversion process includes the steps of:

formatting operand data into a format which is suitable for storage in registers of a register file comprised by the floating-point unit;

detecting whether operand data to be operated on includes a special case exponent; and generating at least one special case flag which indicates whether or not a special case exponent has been detected.

17. The method of claim 16, wherein during the bypass step, the bypass component performs the final conversion process and writes the results of the final conversion process to the register file, wherein the final conversion process completes the memory format-to register format conversion.

18. The method of claim 17, wherein while the bypass component is writing the results of the final conversion process to the register file, the multiply accumulate unit begins operating on the results of the partial conversion process and simultaneously completes the conversion process, wherein during the completion of the conversion process, the multiply accumulate unit utilizes said at least one special case flag in order to obtain a converted exponent value.

19. The method of claim 18, wherein during a first time period from T0 to T1, the bypass component performs the partial conversion process, and wherein during a time period from T1 to T2, the bypass component performs the final conversion process and bypasses the results of the partial conversion process, including said at least one special case flag, to the multiply accumulate unit, and wherein during a time period from T2 to T3, the bypass component writes the results of the final conversion process to the register file, wherein as the bypass component is writing the results of the final conversion process to the register file during the time period from T2 to T3, the multiply accumulate unit performs the final conversion process and simultaneously performs a first operation phase during which the multiply accumulate unit begins performing an arithmetic operation on the results of the partial conversion process, wherein during a time period from T3 to T4, the multiply accumulate unit performs a second operation phase during which the multiply accumulate unit continues to perform the arithmetic operation on the results of the final conversion process, and wherein during a time period from T4 to T5, the multiply accumulate unit performs a third operation phase during which the multiply accumulate unit completes the arithmetic operation on the results of the final conversion process.

\* \* \* \* \*